(12) United States Patent
Huang et al.

(10) Patent No.: US 9,584,963 B2
(45) Date of Patent: Feb. 28, 2017

(54) PORTABLE DEVICE WITH INTEGRATED RADIO RECEIVER

(71) Applicants: TomTom International B.V., Amsterdam (NL); TOMTOM ASIA INC, Taipei (TW)

(72) Inventors: Tung-Che Huang, Hilversum (NL); Ching-Tun Yu, Taipei (TW); Marino Strik, Waalre (NL); Jan Johannes Maria van den Elzen, Gemert (NL)

(73) Assignee: TomTom International B.V, Amsterdam (NL)

( * ) Notice: Subject to any disclaimer, the term of this patent is extended or adjusted under 35 U.S.C. 154(b) by 0 days.

(21) Appl. No.: 14/427,871

(22) PCT Filed: Sep. 12, 2013

(86) PCT No.: PCT/EP2013/068961
§ 371 (c)(1),
(2) Date: Mar. 12, 2015

(87) PCT Pub. No.: WO2014/041102
PCT Pub. Date: Mar. 20, 2014

(65) Prior Publication Data
US 2015/0230049 A1  Aug. 13, 2015

(30) Foreign Application Priority Data

Sep. 12, 2012 (GB) .................................. 1216290.5

(51) Int. Cl.
*H04W 24/00* (2009.01)
*H04W 4/02* (2009.01)
(Continued)

(52) U.S. Cl.
CPC .......... *H04W 4/02* (2013.01); *G01C 21/3688* (2013.01); *G06F 13/385* (2013.01); *G06F 13/4022* (2013.01); *H01Q 1/3233* (2013.01)

(58) Field of Classification Search
CPC ... H04W 4/008; H04W 76/02; H04W 76/045; H04W 76/022
See application file for complete search history.

(56) References Cited

U.S. PATENT DOCUMENTS 7,024,683 B1 * 4/2006 Gee, Jr. .................. H04N 7/163
348/725
7,529,619 B2    5/2009 Lien
(Continued)

FOREIGN PATENT DOCUMENTS

CN       101551693 A     10/2009
CN       101836331 A      9/2010
(Continued)

OTHER PUBLICATIONS

International Search Report issued Dec. 17, 2013 for International (PCT) Application No. PCT/EP2013/068961.

*Primary Examiner* — Kwasi Karikari (57) ABSTRACT

A radio receiver 516 for receiving travel information, such as traffic events or the like, and optionally parts 520, 522 of an antenna therefor, are located within a housing 512 of a portable device having location determining capability, such as a PND 510. A common port 514 is used for connection both to data and power, for example in a home environment, and also to receive signals from the antenna, for example in a vehicle environment, with a switch 518 being provided within the device for switching between the two.

18 Claims, 4 Drawing Sheets

(51) Int. Cl.
*G01C 21/36* (2006.01)
*H01Q 1/32* (2006.01)
*G06F 13/38* (2006.01)
*G06F 13/40* (2006.01)

(56) References Cited

U.S. PATENT DOCUMENTS

| | | |
|---|---|---|
| 7,711,325 B2 | 5/2010 | Sathath et al. |
| 7,974,777 B2 * | 7/2011 | Deurwaarder ......... G01C 21/34 701/117 |
| 8,320,869 B2 | 11/2012 | Van Den Elzen |
| 8,773,316 B2 | 7/2014 | Van Den Elzen |
| 2006/0199569 A1 * | 9/2006 | Lien ...................... G01C 21/26 455/414.3 |
| 2008/0215236 A1 | 9/2008 | Deurwaarder et al. |
| 2009/0247082 A1 * | 10/2009 | Sathath ................. G06F 1/1616 455/41.2 |
| 2011/0216500 A1 * | 9/2011 | van den Elzen .... B60R 11/0258 361/679.41 |
| 2012/0159036 A1 * | 6/2012 | Kim ................... G06F 13/4022 710/316 |
| 2012/0189068 A1 | 7/2012 | Koerner |

FOREIGN PATENT DOCUMENTS

| | | |
|---|---|---|
| CN | 102246351 A | 11/2011 |
| DE | 202006003123 U1 | 6/2003 |
| EP | 2192531 A1 | 6/2010 |
| EP | 2479841 A1 | 7/2012 |
| KR | 20030004817 A | 1/2003 |

\* cited by examiner

PORTABLE DEVICE WITH INTEGRATED RADIO RECEIVER

This application is the National Stage of International Application No. PCT/EP2013/068961, filed Sep. 12, 2013 and designating the United States. The application claims priority from United Kingdom Patent Application No. 1216290.5 filed Sep. 12, 2012. The entire content of both these applications is incorporated herein by reference.

FIELD OF INVENTION

The present invention relates to portable devices having GPS signal reception, and is concerned particularly with such devices which also possess the functionality of receiving radio alert signals.

BACKGROUND TO THE INVENTION

Portable devices, for example Portable Navigation Devices (PNDs), which include GPS (Global Positioning System) signal reception and processing functionality are well known and are widely employed as in-car or other vehicle navigation systems.

In general terms, a modern PND comprises a processor, memory, and map data stored within said memory. The processor and memory cooperate to provide an execution environment in which software operating systems can be established, and additionally it is commonplace for one or more additional software programs to be provided to enable the functionality of the PND to be controlled, and to provide various other functions.

Typically, these devices further comprise one or more input interfaces that allow a user to interact with and control the device, and one or more output interfaces by means of which information may be relayed to the user. Illustrative examples of output interfaces include: a visual display and a speaker for audible output. Illustrative examples of input interfaces include: one or more physical buttons to control on/off operation or other features of the device (which buttons need not necessarily be on the device itself but could be on a steering wheel if the device is built into a vehicle), and a microphone for detecting user speech. In one particular arrangement, the output interface display may be configured as a touch sensitive display (by means of touch sensitive overlay or otherwise) additionally to provide an input interface by means of which a user can operate the device through the display.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Bluetooth, Wi-Fi, Wi-Max, GSM, UMTS and the like.

PNDs of this type also include a GPS antenna by means of which satellite-broadcast signals, including location data, can be received and subsequently processed to determine a current location of the device.

The PND may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically, such features are most commonly provided in in-vehicle navigation systems, but may also be provided in PNDs if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well-known" destinations (such as famous locations, municipal locations (such as sports grounds or swimming baths) or other points of interest), and favourite or recently visited destinations.

Typically, the PND is enabled by software for computing a "best" or "optimum" route between the start destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Potable Digital Assistant), a media player, a mobile phone or the like, and in these cases, the normal functionality of the hand-held system is extended by means of the installation of a hardware module and/or software on the device to perform both route calculation and navigation along a calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of the route, i.e. the desired destination. It is also usual for PNDs to display may information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information can be displayed, optionally in a status bar above, below or to one side of the displayed map information, an example of the navigation information includes a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated, a simple instruction such as "turn left in 100 m" requires significant processing and analysis. As previously mentioned, user interaction with the device may be by a touch screen, or additionally by steering column mounted remote control, by voice activation or by any other suitable method.

In addition, the device may receive messages indicative of current, or at least recent, road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems, for example a Radio Data System (RDS)-Traffic Message Channel (TMS) service, to generate the messages.

Whilst it is known for the device to perform route re-calculation in the event that a user deviates from the previously calculated route during navigation (either by accident or intentionally), a further important function provided by the device, and mentioned above, is automatic route re-calculation in the event that real-time traffic conditions dictate that an alternative route would be more expedient. The device is suitably enabled to recognize such conditions automatically, or if a user actively causes the device to perform route re-calculation for any reason.

It is also known to allow a route to be calculated with user defined criteria for example, the user may wish to avoid any roads on which traffic congestion is likely, expected or currently prevailing. The device software would then calculate various routes using stored information indicative of prevailing traffic conditions or particular roads, and order the calculated routes in terms of level of likely congestion or delay on account thereof. Other traffic information-based route calculation and navigation criteria are also possible.

It should also be mentioned that, although the route calculation and navigation functions are fundamental to the overall utility of PNDs, it is possible to use the device purely for information display, or "free-driving", in which only map and traffic information relevant to the current device location is displayed, and in which no route has been calculated and no navigation is currently being performed by the device. Such a mode of operation is often applicable when the user already knows the route along which it is desired to travel and does not require navigation assistance. Information concerning traffic is still nevertheless of use for this more of operation.

In any event, it can be seen that traffic related information is of particular use when calculating routes and directly a user to a location, or simply when free driving. In this respect, and as mentioned above, it is known to broadcast traffic-related information using the RDS-TMC facility supported by some broadcasters.

It is known to provide a PND with an RDS-TMC receiver for receiving RDS data broadcast, decoding the RDS data broadcast and extracting TMC data included in the RDS data broadcast.

It is also known to provide an accessory comprising an RDS-TMC tuner coupled to an antenna at one end and a connector at another end thereof for coupling the RDS-TMC tuner to an input of the PND. One exemplary arrangement is described in WO 2011/072714 A1 entitled "Enhanced Power Cable Arrangement Apparatus And Method Of Reducing A Common-Mode Interference Signal"; the entire contents of which is incorporated herein by reference. This document describes a power cable arrangement apparatus comprising: a tuner housing and a power adaptor housing; a power cable extending between the tuner housing and the power adaptor housing; and a reception antenna that extends between the tuner housing and the power adapter housing, the reception antenna comprising a pole portion that extends substantially in parallel with and in spaced relation to the power cable; wherein a first end of the reception antenna for coupling to a tuner apparatus is coupled to an amplifier apparatus and a common-mode filter.

The invention is defined in the attached independent claims, to which reference should now be made. Further, preferred features may be found in the sub-claims appended thereto.

SUMMARY OF THE INVENTION

According to one aspect of the present invention there is provided a mobile device having location determining means and a processor, located within a housing, and having a port for connection to a data cable for communicating data and a radio receiver for receiving travel information, the device further comprising a switch arranged in use to control the device to either communicate data via a data cable connected to the port or to receive travel information from a radio antenna connected to the port.

The mobile device, by having location determining means, is therefore a location aware mobile device. In preferred embodiments, the location determining means comprises a global navigation satellite system (GNSS) signal receiver, such as a GPS signal reception unit. It will be understood, however, that the location determining means can be of any suitable and desired form, For example, the mobile device can include a wireless telecommunications device, such as a GSM device, which enables the device to determine its geographic location.

The device may be configured to receive power from a combined data and power cable connected to the port or from a combined radio antenna and power cable connected to the port.

In a preferred arrangement the radio receiver and/or the switch are located within the housing.

The device may also include at least part of a radio antenna located within the housing.

The radio receiver is arranged to receive travel information, which, for example, can include messages about events effecting the flow of traffic along roads. The messages may relate, in examples, to traffic, weather, accidents, black spots, speed cameras, etc. The messages can comprise data in any suitable format, such as TMC or TPEG. The radio receiver may therefore comprise an RDS radio receiver for receiving, for example, TMC signals (i.e. an RDS-TMC receiver). Similarly, the radio receiver may comprise a digital HD radio receiver or a DAB radio receiver.

The port may comprise a USB connection, which may be a mini- or micro-USB connection.

The switch may be an automatic switch and preferably comprises a solid state switch, such as a FET switch. As will be appreciated, the switch is configured to be compatible with the port, and thus the switch, in embodiments in which the port comprises a USB connection, comprises a USB switch.

The port may comprise a number of port-side connectors or pins for connecting with a number of corresponding cable-side connectors or pins. Preferably at least one of the pins comprises a selector pin and is arranged in use to communicate a selection signal for controlling the switch.

Preferably the device comprises a first common mode filter, as part of the antenna, located within the housing, e.g. to reduce interference from the device. The first common mode filter can be of any suitable and desired form, and may, for example, comprise a common-mode coil or a balun.

The device may comprise a low noise amplifier (LNA), as part of the antenna, located within the housing, e.g. to compensate for any loss of signal cause by a non-ideal antenna configuration, for example due to being contained within the (metal) body of a vehicle, pointing to the ground instead of the sky, etc. The LNA therefore acts to increase the signal from the radio antenna to a suitable level for input to the radio receiver.

The device may comprise a second common mode filter, within the housing, e.g. to reduce any interference from the data communication. As with the first common mode filter, the second common mode filter can be of any suitable and desired form, and may for example, comprise a common-mode coil or a balun.

According to another aspect of the invention there is provided a system for receiving radio signals representative of travel information, the system comprising: a mobile device having location determining means and a processor, located within a housing, and having a port for connection to a data cable for communicating data and a radio receiver for receiving travel information; and an antenna cable assembly, including a radio antenna, connectable to the port, the device further comprising a switch arranged in use to control the device to either communicate data via a data cable connected to the port or to receive travel information from the antenna cable assembly when connected to the port.

The system may include an LNA, as part of the antenna, e.g. to compensate for any loss of signal cause by a non-ideal antenna configuration. The LNA may be located within the housing of the device. Alternatively the LNA may be located within the antenna cable assembly.

The system may include a first common mode filter, as part of the antenna, to reduce interference from the device. The first common mode filter may be located within the housing of the device. Alternatively the first common mode filter may be located within the antenna cable assembly.

The antenna cable assembly may comprise a power adapter arranged in use to connect to a power source for supplying power to the device when the antenna cable assembly is connected to the port. The power adaptor may comprise a cigarette lighter adaptor (CLA).

According to another aspect of the invention there is provided a method of receiving radio signals representative of travel information in a mobile device having location determining means and a processor, located within a housing, and having a radio receiver and a port for connecting to a data cable for communicating data, wherein the method comprises connecting a radio antenna to the device through the port and effecting operation of a switch in the device to configure the device for reception of radio signals from the antenna.

Preferably the method comprises effecting automatic operation of the switch upon connection of the antenna to the port.

The invention may include any combination of the features or limitations referred to herein, except such a combination of features as are mutually exclusive, or mutually inconsistent.

A preferred embodiment of the present invention will now be described by way of example only, with reference to the accompanying diagrammatic drawings, in which:

BRIEF DESCRIPTION OF THE DRAWINGS

At least one embodiment of the invention will now be described, by way of example only, with reference to the accompanying drawings, in which.

DETAILED DESCRIPTION OF PREFERRED EMBODIMENTS

The mobile devices can be of any suitable form, but in illustrative embodiments are navigation apparatus, such as portable navigation devices (PNDs). Preferred embodiments of the present invention will now be described with particular reference to a PND. It should be remembered, however, that the teachings of the present invention are not limited to PNDs and that in the context of the present invention, the mobile devices could be a PND, a navigation device built into a vehicle, or indeed a computing resource (such as a desktop or portable personal computer (PC), mobile telephone or portable digital assistant (PDA)).

Figure 1:
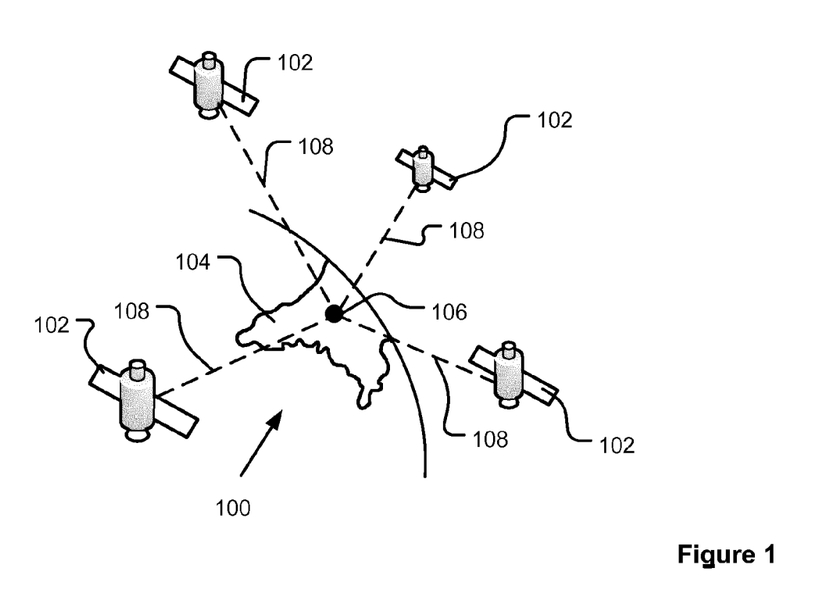
FIG. 1 is a schematic illustration of a Global Positioning System (GPS)

FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 102 are in orbit about the earth 104. The orbit of each satellite 102 is not necessarily synchronous with the orbits of other satellites 102 and, in fact, is likely asynchronous. A GPS receiver 106 is shown receiving spread spectrum GPS satellite signals 108 from the various satellites 102.

The spread spectrum signals 108, continuously transmitted from each satellite 102, utilize a highly accurate frequency standard accomplished with an extremely accurate atomic clock. Each satellite 102, as part of its data signal transmission 108, transmits a data stream indicative of that particular satellite 102. It is appreciated by those skilled in the relevant art that the GPS receiver device 106 generally acquires spread spectrum GPS satellite signals 108 from at least three satellites 102 for the GPS receiver device 106 to calculate its two-dimensional position by triangulation. Acquisition of an additional signal, resulting in signals 108 from a total of four satellites 102, permits the GPS receiver device 106 to calculate its three-dimensional position in a known manner.

It will be apparent from the following that the teachings of the present invention even have utility in circumstances where a user is not seeking instructions as to how to navigate from one point to another, but merely wishes to be provided with information concerning, for example, traffic.

Figure 2:
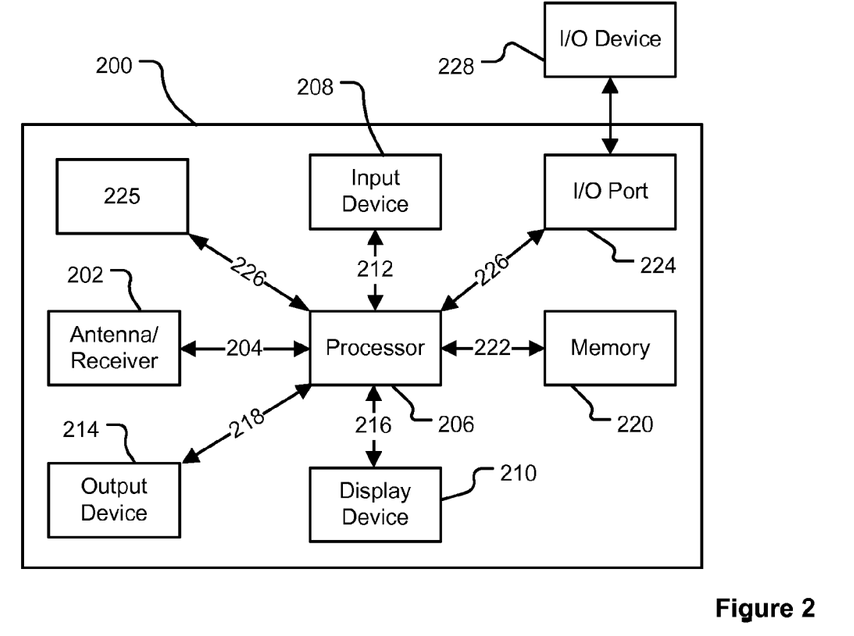
FIG. 2 is a schematic illustration of components of a previously considered navigation device.

Referring to FIG. 2, a navigation device 200 is located within a housing (not shown). The navigation device 200 comprises or is coupled to a GPS receiver device 202 via a connection 204, wherein the GPS receiver device 202 can be, for example, a GPS antenna/receiver. It should be understood that the antenna and receiver designated by reference numeral 202 are combined schematically for illustration, but that the antenna are receiver may be separately located components, and that the antenna may be a GPS patch antenna or helical antenna for example.

The navigation device 200 includes a processing resource comprising, for example, a processor 206, the processor 206 being coupled to an input device 208 and a display device, for example a display screen 210. Although reference is made here to the input device 208 in the singular, the skilled person should appreciate that the input device 208 represents any number of input devices, including a keyboard device, voice input device, touch panel and/or any other known input device utilised to input information. Likewise, the display screen 210 can include any type of display screen for example a Liquid Crystal Display (LCD).

In one arrangement, one aspect of the input device 208, the touch panel, and the display device 210 are integrated so as to provide an integrated input and display device, including a touchpad or touchscreen input to enable both input of information (via direct input, menu selection, etc.) and display of information through the touch panel screen so that a user need only touch a portion of the display screen 210 to select one of a plurality of display choices or to activate one or a plurality of virtual or "soft" buttons. In this respect, the processor 206 supports a Graphical User Interface (GUI) that operates in conjunction with the touchscreen.

In the navigation device 200, the processor 206 is operatively connected to and capable of receiving input information from the input device 208 via a connection 212, and operatively connected to at least one of the display screen 210 and an output device 214, for example an audible output device (e.g. a loudspeaker), via respective output connections 216, 218. As the output device 214 can produce audible information for a user of the navigation device 200, it should equally be understood that the input device 208 can include a microphone and software for receiving input voice commands. Further, the navigation device 200 can also include any additional input device 208 and/or any additional output device, for example audio input/output devices.

The processor 206 is operatively connected to a memory resource 220 via connection 222 and is further arranged to receive/send information from/to input/output (I/O) port 224 via connection 226, wherein the I/O port 224 is connectible to an I/O device 228 external to the navigation device 200. The memory resource 220 comprises, for example, a volatile memory, such as a Random Access Memory (RAM) and a non-volatile memory, for example a digital memory, such as a flash memory.

The external I/O device 228 may include, but is not limited to, an external listening device, such as an earpiece for example. The connection to I/O device 228 can further be a wired or wireless connection to any other external device, for example a car stereo unit for hands-free operation and/or for voice activated operation, for connection to an earpiece or headphones, and/or for connection to a mobile telephone, the mobile telephone connection can be used to establish a data connection between the navigation device 200 and the Internet or any other network for example, and/or to establish a connection to a server via the Internet or some other network for example.

In this regard, the navigation device 200 is capable of establishing a data session, if required, with network hardware or a "mobile" or telecommunication network via mobile device (not shown), for example the mobile telephone described above, a PDA and/or any device with mobile telephone technology, in order to establish a digital connection, for example a digital connection via known Bluetooth technology. Thereafter, through its network service provider, the mobile device can establish a network connection (through the Internet or example) with the server (not shown). As such, a "mobile" network connection can be established between the navigation device 200 (which can be, and oftentimes is, mobile as it travels alone and/or in a vehicle) and the server to provide a "real-time" or last least very "up to date" gateway for information.

In this previously considered example, the navigation device 200 also comprises an input port 225 operatively coupled to the processor 206 for receipt of traffic-related data.

It will, of course, be understood by one of ordinary skill in the art that the electronic units schematically shown in FIG. 2 are powered by one or more power sources (not shown) in a conventional manner. As will also be understood by one of ordinary skill in the art, that different configurations of the units shown in FIG. 2 are contemplated. For example, the components shown in FIG. 2 may be in communication with one another via wire and/or wireless connections and the like. Thus, the navigation device 200 described herein can be a portable or handheld navigation device 200.

It should also be noted that the block diagram of the navigation device 200 described above is not inclusive of all components of the navigation device 200, but is only representative of many example components.

Figure 3:
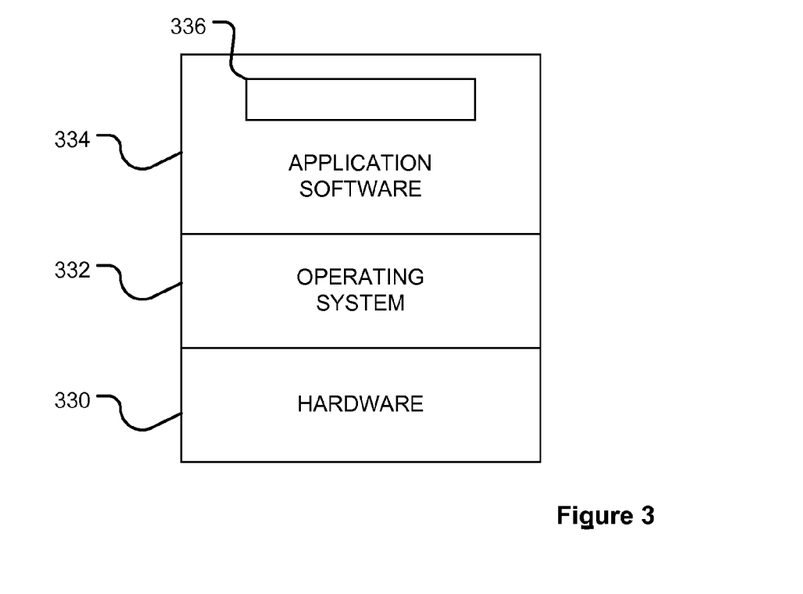
FIG. 3 is a schematic representation of an architectural stack employed by the navigation device of FIG. 2.

Turning to FIG. 3 the memory resource 220 of the navigation apparatus 200 stores a boot loader program (not shown) that is executed by the processor 206 in order to load an operating system 332 from the memory resource 220 for execution by functional hardware components 330, which provides an environment in which application software 334 can run. The operating system 332 serves to control the functional hardware components 330 and resides between the application software 334 and the functional hardware components 330. The application software 334 provides an operational environment including the GUI that supports core functions of the navigation apparatus 200, for example map viewing, route planning, navigation functions and any other functions associated therewith. In this example, part of the application software 334 comprises a traffic data processing module 336 that receives and processes traffic-related data and provides the user with traffic information integrated with map information. As such functionality is not, by itself, core to the embodiments described herein, no further details of the traffic data processing module 336 will be described herein in order not to distract from the description of the embodiments herein.

Figure 4:
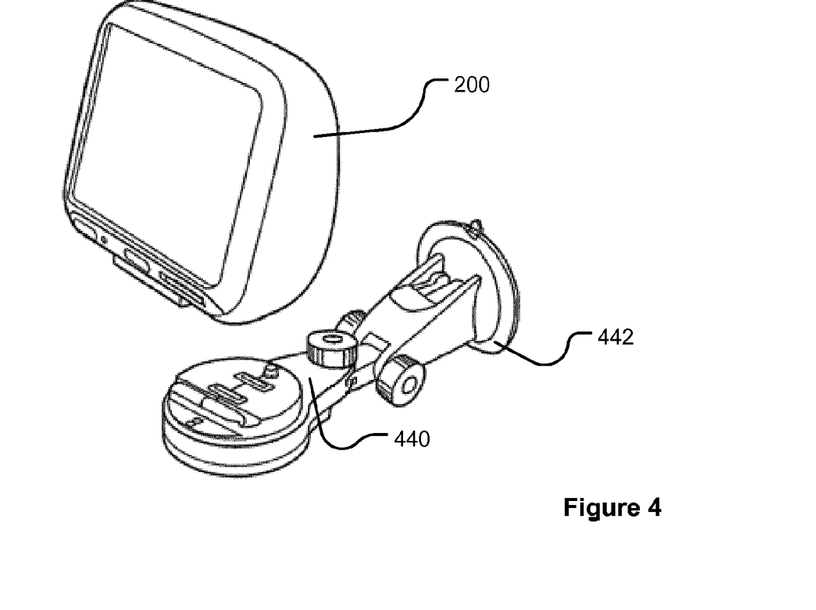
FIG. 4 is a schematic diagram of an arrangement for mounting and/or docking the navigation device of FIG. 2.

Referring to FIG. 4, the navigation device 200 is, in this example, capable of coupling to an arm 440, the arm 440 being capable of being secured to, for example, a vehicle dashboard or window using a suction cup 442. The arm 440 is one example of a docking station with which the navigation device 100 can be docked. The navigation device 200 can be docked with, or otherwise connected to, the docking station 440 by snap connecting the navigation device 200 to the arm 440, for example. The navigation device 200 can also be rotatable on the arm 440. To release a connection between the navigation device 200 and the docking station 440, a button on the navigation device 200 is provided and can be pressed. Other equally suitable arrangements for coupling and decoupling the navigation device 200 to a docking station can alternatively be provided.

There now follows a description of embodiments of the present invention, in which an RDS-TMC receiver, and optionally parts of an antenna therefor, are located integrally within a housing of a PND, and in which a common port is used for connection both to data and power, for example in a home environment, and also to RDS-TMC antenna signals, for example in a vehicle environment, with a switch being provided internally of the device for switching between the two. It will be appreciated, however, that the invention is not limited to RDS-TMC receivers, and can be used with any type of radio receiver, e.g. HD radio or DAB, arranged to receive travel information, such as traffic messages, in a suitable format, e.g. TMC, TPEG or the like.

Figure 5:
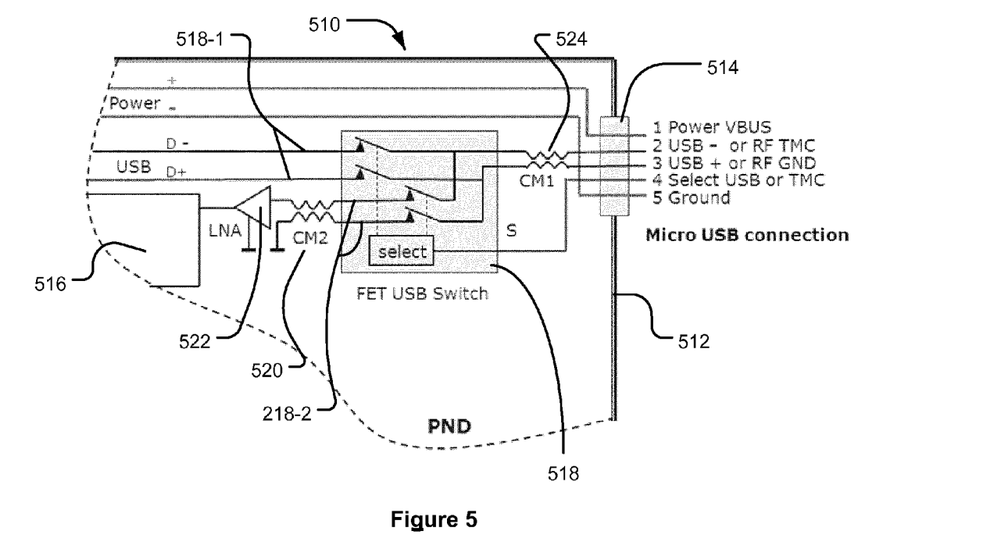
FIG. 5 is a schematic view of part of a PND incorporating an RDS-TMC receiver, in accordance with an embodiment of the present invention.

Referring to FIG. 5 there is shown schematically generally at 510 a portion of a personal navigation device (PND) according to a first embodiment of the present invention. The device comprises a housing 512 and a micro-USB port 514, an RDS-TMC receiver 516, and a USB switch 518, which can be a high speed FET USB switch. Several other components common to PNDs as described above with reference to the earlier figures, notably a GPS reception unit and a processor, are omitted from this diagram for simplicity.

The micro-USB input port 514 has five pins numbered 1-5 in the drawing. Pin 1 is the power VBUS, pin 2 is a USB- or RF TMC (depending upon connection as will be described below), pin 3 is a USB+ or RF GND (depending on connection), pin 4 is a Selection pin for USB or TMC connection and pin 5 is a Ground.

One pair of outputs 518-1 of the switch 518 are connected to the USB channel for data transfer, when the device is connected to a PC, for example. The other pair of outputs 518-2 are connected through a first common mode filter 520 and a low noise amplifier (LNA) 522 to the TMC receiver 516 when the device is connected to a resonant feedline antenna for receiving RDS-TMC signals. A single pair of inputs 518-3 is connected to pins 2 and 3 of the micro-USB port 514 via a second common mode filter 524.

When a combined data and power cable (not shown) connects the PND to a PC via the micro-USB port 514, power is supplied through pins 1 and 5 of the port 514 and data is communicated through pins 2 and 3 of the port 514. A Selection signal on pin 4 controls the switch 518 to connect outputs 518-1 to a data bus in the PND.

However, when in a car, for example, the user connects an RDS-TMC cable as a resonant feedline antenna (not shown) to the port 514 the Selection signal at pin 4 of the port 514 controls the switch 518 to connect outputs 518-2 to the RDS-TMC receiver 516. In this case power is supplied through the antenna cable which has at its other end a cigarette lighter adaptor (CLA), typically connected into a 12V power supply of the vehicle.

The half-wavelength RDS-TMC antenna is ideally stretched to provide the best reception. However, in the vehicle the TMC antenna is not optimally positioned, because it is integral with the CLA. The purpose of the LNA is to compensate for any resulting loss of signal. The common mode coil 524 has a typical impedance of between 50 and 200 Ohm, preferably around 90 Ohm at 100 MHz, and is used to reduce any interference from the USB data communication. The common mode coil 520 is of much higher impedance (relative to the coil 524), typically between 1000 and 4000 Ohm, preferably around 2000 Ohm at 100 MHz and is present to reduce interference from the PND. Coil 520 performs the major part of the common mode suppression. Coils 520 or 524 can act as balun for the antenna.

In a variation of the arrangement shown in FIG. 5, the second common mode coil 520 may be removed completely; if, for example, the printed circuit board (PCB) of the PND can be designed in such a way that the level of interference from the PND can be reduced to a minimal level. The first common mode coil 524 can also, in such an embodiment, be replaced with a balun.

Figure 6:
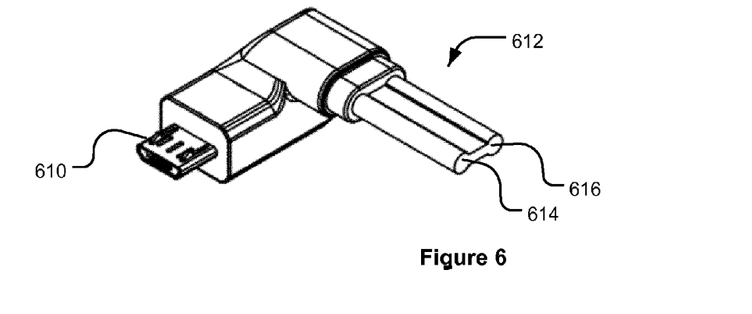
FIG. 6 shows part of an antenna cable assembly for use with the PND of FIG. 5.

FIG. 6 shows a micro-USB connector plug 610, for engagement with port 514, and part of a TMC antenna cable assembly 612. The antenna cable assembly includes a resonant feedline antenna 614 and a power supply 616 which terminates in a CLA (not shown) at a distal end of the cable assembly.

Figure 7:
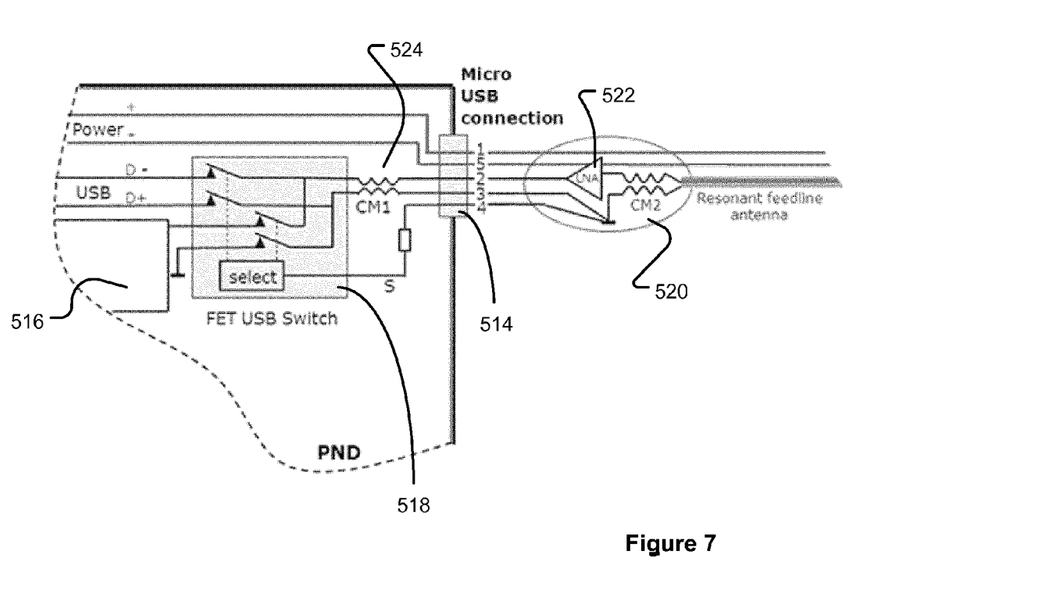
FIG. 7 shows schematically an alternative embodiment of PND in accordance with the present invention.

FIG. 7 shows schematically an alternative embodiment of the invention in which the common mode coil 520 and LNA 522 are located outside the PND and within a capsule 710 integrated into the combined power/antenna cable. In this embodiment the components 520 and 522 are separated from the PND and therefore less susceptible to radiated interference from the PND. The TMC antenna outputs from the capsule to the port 514 are in the form of a shielded pair. The pin configurations of the micro-USB connection are different in this embodiment, with pin 1 taking the Power VBUS, pin 2 taking the Ground, pin 3 taking USB- or RF TMC, pin 4 taking USB- or RF GND and pin 5 taking the Selection signal for the switch.

Embodiments of the present invention enable the integration of an RDS/TMC receiver in a PND without the need for an additional RF antenna connection port in the PND. This is facilitated by the use of the relatively low cost USB switch within the PND, which connects to the PC in a home environment and to an antenna in a vehicle environment dependent upon a Selection signal.

With the RDS-TMC receiver and, optionally, parts of the antenna located within the PND housing, an easily mountable system is provided which does not require separate ports for use with data and with an antenna.

It will be appreciated that whilst various aspects and embodiments of the present invention have heretofore been described, the scope of the present invention is not limited to the particular arrangements set out herein and instead extends to encompass all arrangements, and modifications and alterations thereto.

It will also be well understood by persons of ordinary skill in the art that whilst the preferred embodiment may implement certain functionality by means of software, that functionality could equally be implemented solely in hardware (for example by means of one or more SICs (application specific integrated circuit)) or indeed by a mix of hardware and software.

Lastly, it should be noted that whilst the accompanying claims set out particular combinations of features described herein, the scope of the present invention is not limited to the particular combinations hereafter claims, but instead extends to encompass any combination of features or embodiments herein disclosed irrespective of whether or not that particular combination has been specifically enumerated in the accompanying claims at this time.

The invention claimed is:

1. A mobile device having location determining means and a processor, located within a housing, and having a port for connection to a data cable for communicating data and a radio receiver for receiving travel information, the device further comprising a switch arranged in use to control the device to either communicate data via a data cable connected to the port or to receive travel information from a radio antenna connected to the port, wherein the device is configured to receive power from an external source via a combined radio antenna and power cable connected to the port.

2. A device according to claim 1, wherein the device is further configured to receive power from an external source via a combined data and power cable connected to the port.

3. A device according to claim 1, wherein the device also includes part of an radio antenna located within the housing.

4. A device according to claim 1, wherein the radio receiver comprises an RDS-TMC receiver.

5. A device according to claim 1, wherein the port comprises a USB connection.

6. A device according to claim 1, wherein the switch comprises an automatic switch.

7. A device according to claim 6, wherein the switch comprises a FET switch.

8. A device according to claim 1, in which the port comprises a number of port-side connectors or pins for connecting with a number of corresponding cable-side connectors or pins, and at least one of the pins comprises a selector pin and is arranged in use to communicate a selection signal for controlling the switch.

9. A device according to claim 1, in which the device comprises a first common mode filter, as part of the antenna to reduce interference from the device.

10. A device according to claim 9, wherein the first common mode filter is located within the housing.

11. A device according to claim 1, wherein the device comprises a low noise amplifier (LNA), as part of the antenna.

12. A device according to claim 11, wherein the low noise amplifier is located within the housing.

13. A device according to claim 1, wherein the device comprises a second common mode filter, within the housing, to reduce any interference from the data communication.

14. A system for receiving radio signals representative of travel information, the system comprising: a mobile device having location determining means and a processor, located within a housing, and having a port for connection to a data cable for communicating data and a radio receiver for receiving travel information; and an antenna cable assembly, including a radio antenna, connectable to the port, the device further comprising a switch arranged in use to control the device to either communicate data via a data cable connected to the port or to receive travel information from the antenna cable assembly when connected to the port, wherein the antenna cable assembly comprises a power adapter arranged in use to connect to a power source for supplying power to the device from an external source when the antenna cable assembly is connected to the port.

15. A system according to claim 14, comprising a low noise amplifier, as part of the antenna.

16. A system according to claim 15, wherein the low noise amplifier is located within the housing of the device or within the antenna cable assembly.

17. A system according to claim 14, wherein the system includes a first common mode filter, as part of the antenna, to reduce interference from the device.

18. A system according to claim 17, wherein the first common mode filter is located within the housing of the device or within the antenna cable assembly.

* * * * *